Patented Sept. 13, 1927.

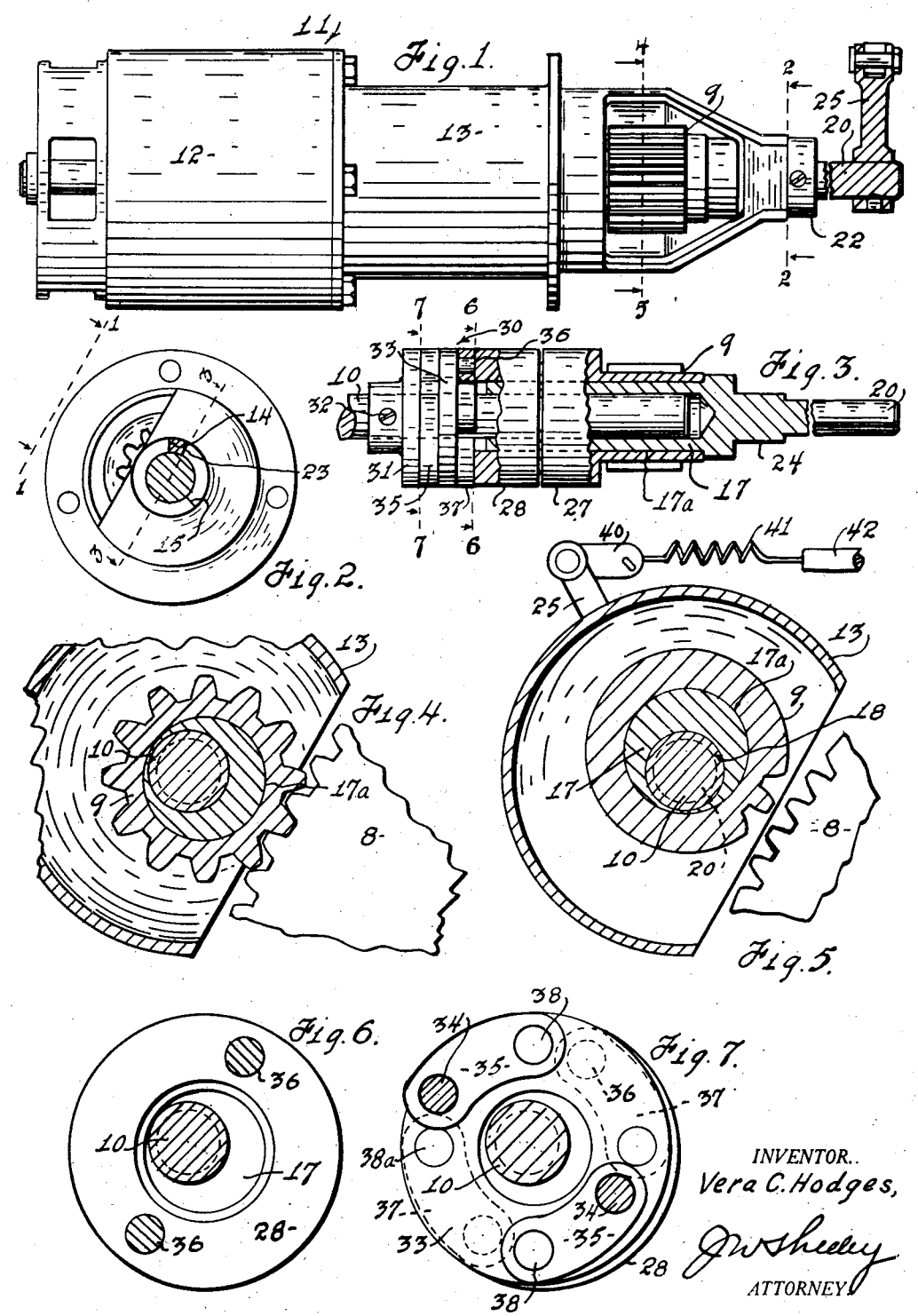

1,642,109

UNITED STATES PATENT OFFICE.

VERA C. HODGES, OF LOS ANGELES, CALIFORNIA.

GEAR-SHIFTING MECHANISM FOR ENGINE STARTERS AND THE LIKE.

Application filed November 10, 1926. Serial No. 147,523.

The present invention relates to mechanisms for bringing gears, rollers and the like into and out of engagement with each other, and while my invention is applicable to numerous purposes, the present disclosure is directed more particularly to engine starters.

The invention has for its principal object the provision of efficient means for moving one gear into mesh with another gear without causing one gear to slide over another. In engine starters, change speed gearing and the like gears are moved into mesh with each other by causing one gear to slide over another while one of the gears is revolving relatively to the other. In such mechanisms the points of the gears often come together first, causing so-called grinding of the gears and resultant wear and noise. Even though the gears of the teeth mesh without grinding, there is always an appreciable interval of time during which a very small portion of the length of the teeth of one gear are driving the other gear, and it is during such interval that the edges of the teeth break under the great strain which is imposed upon them.

It is therefore another object of my invention to provide mechanism of the class described in which the full length of one gear meshes directly with the full length of another gear immediately the gears are in operating engagement with each other.

Another object of the invention is to provide mechanism of the class described in which one gear is moved into mesh with another gear by causing the shifted gear to move laterally rather than longitudinally. My invention contemplates the positioning of two gears so that one is parallel to the other at all times whereby the gears may be brought into mesh throughout their entire face width. Inasmuch as each gear should, for practical reasons, be carried on a shaft to which it is operatively connected, it is another and important object of my invention to provide for moving one gear into mesh with another gear laterally without moving either of the shafts laterally.

I have illustrated one practical embodiment of my invention by the accompanying drawings.

In the said drawings:—

Figure 1 is a plan view of such embodiment on line 1—1 of Fig. 2.

Figure 2 is a view in section on a line 2—2 of Fig. 1.

Figure 3 is a view in section on a line 3—3 of Fig. 2.

Figure 4 is a sectional view on line 4—5, Fig. 1, showing the relative position of the parts when the gears are in mesh.

Figure 5 is a view in section on a line 4—5 of Fig. 1, showing the position of the parts when the gears are out of mesh.

Figure 6 is a sectional view on line 6—6 of Fig. 3.

Figure 7 is a sectional view on line 7—7 of Fig. 3.

More specially, 8 indicates a gear which is to be driven, such for instance as the flywheel gear of an internal combustion engine (not shown). A meshing gear 9 is provided, which by means, more particularly described hereinafter, is carried and driven by a shaft 10 of an electric motor 11. The motor is of any usual type and includes a casing 12 and a casing extension 13 which is provided with stops 14 and 15, spaced apart a suitable number of degrees of a circle.

The motor shaft 10 terminates in a free end, and said shaft is permanently connected to the armature (not shown) so that the shaft revolves positively when the motor is running.

Upon shaft 10 there is revolubly mounted a quill 17, which is provided with an eccentric bore 18, the margins of said bore being a close running fit over the motor shaft. The quill is therefore eccentrically mounted on the motor shaft. The quill is provided with an extension or spindle 20 which is coaxial to the bore 18, and thus the spindle 20 is at all times coaxial to the motor shaft while the circumference 17ª of the quill is eccentric to the motor shaft. The quill is loosely fitted over the motor shaft so that it is movable revolubly relatively thereto, but its orbit of revoluble movement, relatively to the motor casing, is limited by an attached collar 22, having a stop 23 coacting with the stops 14 and 15. To spindle 20 there is added an integral extension 24, to which is connected an operating arm 25. Thus the operating arm may be employed to rock the quill on the motor shaft so that the circumference of the quill will move eccentrically with regard to the motor shaft.

Revolubly mounted upon the quill there is provided the gear 9, which is accordingly eccentric of the circumference of the quill and movable eccentrically with regard to the motor shaft. Said gear is attached to or integral with a clutch member 27, and clutch member 27 coacts with another clutch member 28 to provide a complete overrunning or ratchet clutch. Both members of the clutch (and therefore the clutch as a whole) are concentric with the gear. Any suitable type of overrunning clutch may be employed, but in the present embodiment I have shown the well known type of silent roller clutch. This clutch is so arranged that the motor may drive the large gear through the small gear while the large gear is incapable of driving the motor through the small gear; such expediencies in engine starters and the like being well understood. In fact, in so far as the actual meshing and unmeshing of the two gears are concerned, the clutch does not function, and the two clutch members may be regarded as a solid part of the gear. The gear is connected to the motor shaft by a special coupling which is generally indicated by the numeral 30. Said coupling comprises a disc 31 fixed to the motor shaft concentrically as at 32, a ring 33 loosely encompassing the motor shaft, a plurality of links 35, and 37 and pins 34, 36 and 38. The ring 33 is large enough to be moved from a position concentrically of the motor shaft, to a position eccentrically thereof.

The links, of which there are four in number in this embodiment, are each provided at each end with an aperture, through which a corresponding pin may extend. Two of the links 35—35 connect the pins of the disc 31 with the ring 33, while the other links 37 connect the said ring 33 with the gear through the pins 36 and 38. Thus the motor shaft is connected to the gear at all times regardless of the eccentric position of such gear. By providing the ring intermediately of the disc and clutch, I have provided for distributing the strain on the links and pins so that the links do not tend to wear as rapidly as would be the case if the links connected the clutch directly to the disc 31.

The lever 25 of the quill, is provided at its outer end with a link 40, to which is attached a spring 41, and a pull rod or cable 42, by means of which the quill is rocked upon the motor shaft. Rod 42 leads to a foot pedal or starter button (not shown) which also controls the electrical circuit with which the armature is connected. In fact, by any means common to electric starters and like devices, the rod may be caused to pull on the spring 41 simultaneously with the energization of the armature.

The operation of my improved gear meshing device will be better understood from the following:—When the stop 23, on spindle 20, is over against stop 14, the gear 26 is disposed so that it is out of mesh with the fly-wheel gear. To move the gear 26 into mesh with the other gear, the rod 42 is pulled so that the spring pulls the quill yieldably a few degrees around the armature shaft. Thus the center or axis of the gear 26 is moved toward the fly-wheel gear, causing the teeth of the respective gears to become intermeshed. Should the teeth of respective gears strike without meshing, the spring will hold the smaller gear yieldably against the larger gear until the smaller gear has turned a few degrees, whereupon a tooth of the smaller gear will be free to enter the corresponding gap between two spaced teeth of the larger gear. This may occur either while the small gear is turning or while it is otherwise motionless.

The flexible coupling 30 causes the gear 26 to be driven positively, through the clutch, by the armature shaft even while the said gear is being moved from one eccentric position to another. Figure 5 shows that the gears are out of mesh, and in Figure 4 the gear 26 is shown as having been turned upon the armature shaft to such extent as to bring it into mesh with the larger gear. When the parts are so disposed that the gears are in mesh, the stop 23 is against the stop 15, and the quill cannot be revolved further relative to the armature shaft. The gears may be left in mesh until the engine is started, and if the engine runs faster than the armature shaft, the overrunning clutch will prevent the engine from driving the armature reversely.

To disengage the small gear from driving engagement with the larger gear, the spring is released so that friction alone is free to throw the quill back to the position in which it is shown in Fig. 5.

It will be apparent now that I have provided for positively driving a gear with an armature shaft, while the said gear is disposed or is being moved, eccentrically of the said shaft, and by disposing such gear so that it may be meshed with another gear I have provided for shifting gears in any gear shift mechanism in such manner that the full length of the teeth of one gear comes into full mesh with the full length of the teeth of another gear without the necessity of sliding one gear longitudinally of the other.

While I have shown and described a specific embodiment of my invention and have illustrated its application to engine starters, it will be understood that I do not limit myself to any specific construction, nor do I limit myself to any specific application, and I may apply my invention in any embodiment for any purpose without enlarging the scope of my invention, as set forth in the appended claims.

What I claim:—

1. In a device of the class described, a revoluble shaft, an eccentric quill mounted to oscillate on said shaft; said shaft being at all times independently revoluble in said quill, an annular pinion independently revoluble at all times on said quill, a flexible coupling to said shaft, and a member connecting said coupling with said pinion, and manually operable means for oscillating said quill on said shaft at any time.

2. In a device of the class described, a revoluble shaft, an eccentric quill mounted to oscillate on said shaft; said shaft being at all times independently revoluble in said quill, an annular pinion independently revoluble at all times on said quill, a flexible coupling to said shaft, and a member connecting said coupling with said pinion, manually operable means for oscillating said quill on said shaft at any time, and an overrunning clutch providing positive one-way driving connection between said coupling and said pinion.

3. In a device of the class described, a revoluble shaft, an eccentric quill mounted to oscillate on said shaft; said shaft being at all times independently revoluble in said quill, an annular pinion independently revoluble at all times on said quill, a flexible coupling, an overrunning clutch providing positive one-way driving connection between said coupling and said pinion; said coupling connecting said shaft with said clutch, and manually operable means for oscillating said quill on said shaft at any time; said means limiting the degree of oscillation of said quill.

4. In a device of the class described, a revoluble shaft, an eccentric quill mounted to oscillate on said shaft; said shaft being at all times independently revoluble in said quill, manually operable means for imparting oscillation to said quill at any time, an overrunning clutch revoluble on said quill and comprising a first clutch member and a second clutch member, a pinion attached to said second clutch member and revoluble at all times with said second clutch member on said quill, and a flexible coupling between said first named clutch member and said shaft.

5. In a device of the class described, a revoluble shaft, an eccentric quill mounted to oscillate on said shaft; said shaft being at all times independently revoluble in said quill, manually operable means for imparting oscillation to said quill at any time, an overrunning clutch revoluble on said quill and comprising a first clutch member and a second clutch member, a pinion attached to said second clutch member and revoluble at all times with said second clutch member on said quill, and a flexible coupling between said first named clutch member and said shaft; said coupling comprising two spaced collars; one fixed to said shaft and the other fixed to said first clutch member, said coupling further comprising; a loose ring between said collars, links connecting one collar with said ring and other links connecting said ring with the other collar.

6. In a device of the class described, a shaft, an eccentric independently encompassing said shaft, a pinion independently revoluble on said eccentric, a collar loosely encompassing said shaft, a member connecting said collar to said pinion, a second collar surrounding said shaft and attached thereto, a ring loosely encompassing said shaft between said collars, pins on each of said collars projecting toward said ring, other pins on said ring projecting toward the respective collars, and links connecting corresponding collar pins with corresponding ring pins.

VERA C. HODGES.